US009560288B2

(12) United States Patent
Ishida et al.

(10) Patent No.: US 9,560,288 B2
(45) Date of Patent: Jan. 31, 2017

(54) OMNIDIRECTIONAL CAMERA

(75) Inventors: Takeshi Ishida, Tokyo-to (JP);
Masahiro Saito, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 627 days.

(21) Appl. No.: 13/466,604

(22) Filed: May 8, 2012

(65) Prior Publication Data

US 2012/0293612 A1 Nov. 22, 2012

(30) Foreign Application Priority Data

May 19, 2011 (JP) .................................. 2011-112047

(51) Int. Cl.
*H04N 5/225* (2006.01)
*H04N 5/247* (2006.01)
(Continued)

(52) U.S. Cl.
CPC ............ *H04N 5/247* (2013.01); *H04N 5/2258* (2013.01); *H04N 5/2259* (2013.01);
(Continued)

(58) Field of Classification Search
CPC H04N 5/2258; H04N 5/2259; H04N 5/23238; H04N 5/247; H04N 5/772
See application file for complete search history.

(56) References Cited

U.S. PATENT DOCUMENTS 6,094,510 A * 7/2000 Yaguchi ................. G06T 9/004
382/166

6,661,454 B1 12/2003 Hwang et al.
(Continued)

FOREIGN PATENT DOCUMENTS

| EP | 0908755 A1 | 4/1999 |
| JP | 5-35587 A | 2/1993 |

(Continued)

OTHER PUBLICATIONS

Extended European Search Report mailed Jun. 28, 2013 in corresponding European patent application No. EP 12167808.0.
(Continued)

*Primary Examiner* — Dave Czekaj
*Assistant Examiner* — Md Haque
(74) *Attorney, Agent, or Firm* — Nields, Lemack & Frame, LLC

(57) ABSTRACT

An omnidirectional camera having a camera for acquiring a digital image, an image data processing device for compressing a signal output from the camera and an external memory is disclosed. In the omnidirectional camera, a writing changeover unit accumulates signals output from a signal processing unit in one of a set of first internal memories until data is accumulated to a predetermined amount. When the data is accumulated to a predetermined amount, the writing changeover unit changes destinations and accumulates signals output from the signal processing unit in the other of the set of first internal memories. The signal is output to a data converting unit from the first internal memory where accumulation reaches the predetermined amount, and the data conversion unit compresses and converts an inputted signal to an image signal and the image signal is inputted to the external memory by an input/output control unit.

4 Claims, 4 Drawing Sheets

(51) Int. Cl.
*H04N 5/77* (2006.01)
*H04N 5/91* (2006.01)
*H04N 5/232* (2006.01)

(52) U.S. Cl.
CPC ......... *H04N 5/23238* (2013.01); *H04N 5/772* (2013.01); *H04N 5/91* (2013.01)

(56) References Cited

U.S. PATENT DOCUMENTS

| | | | |
|---|---|---|---|
| 6,990,240 B2* | 1/2006 | Hagiwara | G06T 9/007 382/232 |
| 7,415,166 B2 | 8/2008 | Kubota | |
| 7,539,356 B2* | 5/2009 | Igari | G06T 3/4038 345/629 |
| 7,552,025 B2 | 6/2009 | Ohtomo et al. | |
| 7,693,393 B2 | 4/2010 | Ohnishi | |
| 7,734,104 B2 | 6/2010 | Yamane et al. | |
| 8,423,704 B2 | 4/2013 | Morgan et al. | |
| 8,545,396 B2 | 10/2013 | Cover et al. | |
| 8,639,045 B2 | 1/2014 | Yokomitsu et al. | |
| 8,643,753 B2 | 2/2014 | Li et al. | |
| 2002/0001410 A1 | 1/2002 | Hagiwara | |
| 2004/0196390 A1* | 10/2004 | Shimazu | H04N 5/232 348/231.99 |
| 2005/0093886 A1* | 5/2005 | Kubota | H04N 1/3872 345/619 |
| 2006/0041886 A1 | 2/2006 | Shintani | |
| 2006/0140578 A1* | 6/2006 | Ohnishi | G11B 27/36 386/270 |
| 2007/0121720 A1 | 5/2007 | Yamane et al. | |
| 2007/0124783 A1 | 5/2007 | Ahiska et al. | |
| 2007/0216810 A1* | 9/2007 | Min | H04M 1/72544 348/586 |
| 2008/0088719 A1 | 4/2008 | Jacob et al. | |
| 2008/0139881 A1* | 6/2008 | Cover | A61B 1/00016 600/103 |
| 2009/0231466 A1* | 9/2009 | Morgan | H04N 5/772 348/231.1 |
| 2012/0147959 A1 | 6/2012 | Amano et al. | |
| 2014/0092207 A1 | 4/2014 | Saito et al. | |

FOREIGN PATENT DOCUMENTS

| | | |
|---|---|---|
| JP | 5-191781 A | 7/1993 |
| JP | 6-268955 A | 9/1994 |
| JP | 9-163182 A | 6/1997 |
| JP | 2000-23013 A | 1/2000 |
| JP | 2000-261759 A | 9/2000 |
| JP | 2002-16870 A | 1/2002 |
| JP | 2005-12619 A | 1/2005 |
| JP | 2005-353193 A | 12/2005 |
| JP | 2006-87069 A | 3/2006 |
| JP | 2006-197181 A | 7/2006 |
| JP | 2007-171048 A | 7/2007 |
| JP | 3956360 B2 | 8/2007 |
| JP | 4270543 B2 | 6/2009 |

OTHER PUBLICATIONS

Topcon Corporation, IP-S2 Lite, Mobile Mapping System, Product Information, 2011, 4 pages.
Topcon Corporation, IP-S2, Mobile Survey System, Product Information, 2010, 6 pages.
Japanese communication issued Jan. 29, 2015 in corresponding Japanese patent application No. 2011-112047.
European communication dated May 28, 2015 in corresponding European patent application No. 12167808.0.
Journal of Real-Time Image Processing, Aug. 2006, vol. 1, No. 1, pp. 63-68, "High-speed JPEG coder implementation for a smart camera", Van Dyck, et al.
Final rejection mailed Jan. 27, 2016 in co-pending U.S. Appl. No. 14/031,441.
Canadian communication, dated Jul. 30, 2015 in co-pending Canadian patent application No. 2,827,934.
Office action mailed Sep. 2, 2015 in co-pending U.S. Appl. No. 14/031,441.
Notice of Allowance mailed Sep. 19, 2016 in co-pending U.S. Appl. No. 14/031,441.
Office action mailed Jun. 13, 2016 in co-pending U.S. Appl. No. 14/031,441.

* cited by examiner

OMNIDIRECTIONAL CAMERA

BACKGROUND OF THE INVENTION

The present invention relates to an omnidirectional camera, which is provided with a plurality of cameras and is used to take omnidirectional images.

As map information or the like to be used for navigator, image data along a route are acquired, and further, measurement is performed based on the images acquired. An omnidirectional camera is used for acquiring such images. The omnidirectional camera is installed on a ceiling of a mobile object such as an automobile or the like, and while the mobile object is moving, the omnidirectional camera takes image of buildings, structures, and sceneries or the like along the route.

For such purpose, a speed to sequentially take in the images acquired by the omnidirectional camera must correspond to a moving speed of the mobile object, and the speed of the mobile object is limited to the speed to take in the images.

A signal itself outputted from image pickup element of the omnidirectional camera is not image data and the signal has an enormous amount of data. Therefore, for the purpose of storing the data as image data, the data must be converted to the image data and the data must also be compressed.

Referring to FIG. 4, description will be given below on a conventional type image data processing device which compresses the data outputted from the camera (image pickup element) as image data. To simplify the explanation, processing of the data, which are outputted from a single camera, is shown.

In FIG. 4, reference numeral 1 represents an image data processing device, numeral 2 represents a photodetection signal outputted from a camera, numeral 3 represents an external memory, and numeral 4 represents a CPU. Describing more concretely, the photodetection signal 2 is a photodetection signal outputted from pixel of image pickup element of the camera. As the external memory 3, DRAM (Dynamic Random Access Memory) such as DDR2 (Double Data Rate 2) or the like is used, for instance.

The image data processing device 1 primarily comprises a signal processing unit 5, a first internal memory 6, an input/output control unit 7, a memory controller 8, a second internal memory 9, a data conversion unit 10, a third internal memory 11, a fourth internal memory 12, an image data input/output unit 13, and an internal register 14.

The photodetection signal 2 is inputted to the signal processing unit 5. The signal processing unit 5 converts the photodetection signal 2 thus inputted from a serial signal to a parallel signal. After performing signal processing as required such as conversion of number of bits or the like, the signal are outputted to the first internal memory 6.

The first internal memory 6 temporarily stores the signals until the inputted signals reach a predetermined amount. In this case, the predetermined amount is "2048 pixels×16", for instance. When the stored data amount reaches "2048 pixels×16", the data are written in the external memory 3 via the input/output control unit 7 and the memory controller 8. In this case, the memory controller 8 controls timing of the writing of the data into the external memory 3 and a region of the external memory 3 where the data are written.

The external memory 3 has a photodetection signal storage region where the photodetection signal 2 is stored and an image data storage region where the image data are stored. The signals outputted from the first internal memory 6 are stored in the photodetection signal storage region via the input/output control unit 7 and the memory controller 8 (arrow mark "a" in FIG. 4).

The photodetection signals 2 are continuously inputted to the first internal memory 6. The signals stored in the first internal memory 6 are written in the external memory 3 via the memory controller 8 each time the data reaches the predetermined amount, and the data are stored in the external memory 3. When the amount of the stored data reaches an amount corresponding to one image frame, the input/output control unit 7 cuts out the data of a predetermined amount out of amount for one frame (e.g. "2048 pixels×16") (arrow mark "b" in FIG. 4) via the memory controller 8, and the data are outputted to the second internal memory 9.

A JPEG encoder is used as the data conversion unit 10, for instance, and the JPEG encoder compresses and converts the signals accumulated in the second internal memory 9 to image data of JPEG. The image data thus converted are temporarily stored in the third internal memory 11, and the data are written from the input/output control unit 7 into the external memory 3 at required timing which is controlled by the memory controller 8.

The data, each in the predetermined amount, are compressed and converted to image data at the data conversion unit 10, and the data are sequentially written in the external memory 3. When the image data thus converted reach the amount for one frame, the data are stored in the image data storage region as the image data for one frame (arrow mark "c" in FIG. 4).

Next, in a case where the CPU 4 carries out the measurement or the like according to the image data, a reading command is issued to the input/output control unit 7 via the image data input/output unit 13, and the image data are read via the memory controller 8 (arrow mark "d" in FIG. 4). Then, the image data are outputted to the CPU 4 via the fourth internal memory 12 and the image data input/output unit 13.

In the image data processing device 1, it is so arranged that data of large capacity for one frame are inputted and outputted by as many as four times between the image data processing device 1 and the external memory 3. Also, conversion and compression of the image data are carried out for each frame. As a result, an image processing is naturally performed with a delay of one frame.

For this reason, in the image data processing as performed in the past, giving and taking of the data to and from the external memory 3 used to be a bottleneck in the processing. Further, because there has been time lag of one frame in the conversion or the compression of the image data or the like, the speed to take in the images acquired by the camera has been limited. Also, in a case where there are two or more cameras as in the case of the omnidirectional camera and the two or more cameras acquire the images at the same time, the limitation on the speed to take in the image has been an important problem.

SUMMARY OF THE INVENTION

It is an object of the present invention to speed up the image conversion of the data acquired by the cameras.

To attain the above object, an omnidirectional camera according to the present invention comprises a camera for acquiring a digital image, an image data processing device for compressing a signal outputted from the camera and for converting the signal to an image signal, and an external memory, and in the omnidirectional camera, the image data processing device has a signal processing unit for taking in the signal, a writing changeover unit, two first internal memories in one set, a data converting unit, a third internal memory for temporarily storing the data after conversion outputted from the data converting unit, and an input/output control unit for controlling input and output of the data between the third internal memory and the external memory, and the writing changeover unit accumulates signal outputted from the signal processing unit in one of the first internal memories until the data are accumulated to a predetermined amount, and when the data are accumulated to the predetermined amount, writing changeover unit changes destination of accumulation and repeatedly accumulates the data in the other of the first internal memories, and the signal is outputted to the data converting unit from the first internal memory where accumulation of the signal reaches the predetermined amount, and the data conversion unit compresses and converts an inputted signal to an image signal, and the image signal is successively inputted to the external memory by the input/output control unit.

Further, the omnidirectional camera according to the present invention comprises two or more the cameras, and in the omnidirectional camera, the signal processing unit, the writing changeover unit, the two first internal memories in one set, the data conversion unit, and the third internal memory are provided as many as the number of the cameras correspondingly to each of the cameras respectively.

Further, in the omnidirectional camera according to the present invention, the input/output control unit comprises a request mediating unit for giving priority ranking to each of two or more writing requests inputted from the third internal memory, and a data stocking unit for temporarily storing the data after conversion, which is outputted from the data conversion unit and corresponds to the writing request, and the data after conversion are written in the external memory according to the priority ranking as given.

Further, in the omnidirectional camera according to the present invention, the predetermined amount of the accumulated signal is an amount of minimal unit, to which the data conversion unit can compress and convert the data.

According to the present invention, the omnidirectional camera comprises a camera for acquiring a digital image, an image data processing device for compressing a signal outputted from the camera and for converting the signal to an image signal, and an external memory, and in the omnidirectional camera, the image data processing device has a signal processing unit for taking in the signal, a writing changeover unit, two first internal memories in one set, a data converting unit, a third internal memory for temporarily storing the data after conversion outputted from the data converting unit, and an input/output control unit for controlling input and output of the data between the third internal memory and the external memory, and the writing changeover unit accumulates signal outputted from the signal processing unit in one of the first internal memories until the data are accumulated to a predetermined amount, and when the data are accumulated to the predetermined amount, writing changeover unit changes destination of accumulation and repeatedly accumulates the data in the other of the first internal memories, and the signal is outputted to the data converting unit from the first internal memory where accumulation of the signal reaches the predetermined amount, and the data conversion unit compresses and converts an inputted signal to an image signal, and the image signal is successively inputted to the external memory by the input/output control unit. As a result, the taking-in of the data from the camera and compression and conversion of the data are carried out at the same time. The number of the processes of giving and taking of the data to and from the external memory is reduced and it is possible to extensively reduce the time required for compression and conversion of the data.

Further, according to the present invention, the omnidirectional camera comprises two or more the cameras, and in the omnidirectional camera, the signal processing unit, the writing changeover unit, the two first internal memories in one set, the data conversion unit, and the third internal memory are provided as many as the number of the cameras correspondingly to each of the cameras respectively. As a result, compression and conversion of the signals from each of the cameras can be separately conducted and the time required for conversion is shortened. Therefore, it is possible to increase the speed of image pickup by the omnidirectional camera.

Further, according to the present invention, in the omnidirectional camera, the input/output control unit comprises a request mediating unit for giving priority ranking to each of two or more writing requests inputted from the third internal memory, and a data stocking unit for temporarily storing the data after conversion, which is outputted from the data conversion unit and corresponds to the writing request, and the data after conversion are written in the external memory according to the priority ranking as given. As a result, a data amount to be further written is reduced, and the writing of the data to the external memory is not delayed, and is performed smoothly.

Furthermore, according to the present invention, in the omnidirectional camera, the predetermined amount of the accumulated signal is an amount of minimal unit, to which the data conversion unit can compress and convert the data. As a result, capacity of the internal memory may be small. Further, because of compression and conversion of the data in the amount of minimal unit compression and conversion of the data can be completed within short time, and taking-in of the data and compression and conversion of the data can be simultaneously carried out at real time.

DETAILED DESCRIPTION OF THE PREFERRED EMBODIMENT

Description will be given below on an embodiment of the present invention by referring to the attached drawings.

Figure 1:
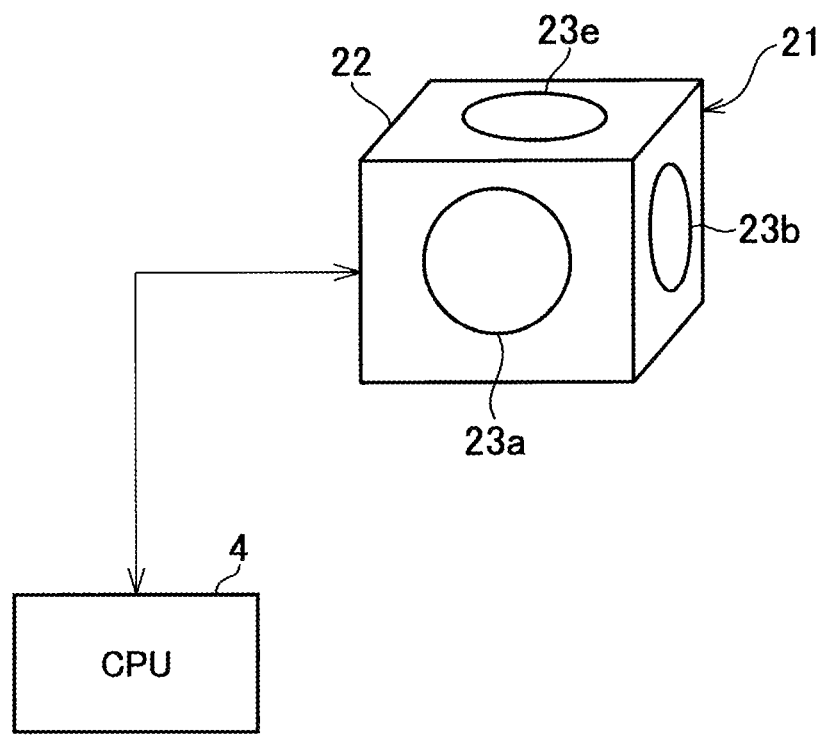
FIG. 1 is a schematical drawing of an omnidirectional camera according to an embodiment of the present invention.

First, referring to FIG. 1, description will be given on an example of an omnidirectional camera 21, in which the present invention is applied.

On four side surfaces vertically crossing each other of a camera housing 22, cameras 23a, 23b, 23c and 23d (cameras 23c and 23d are not shown in the figure) each for taking a digital image are disposed, and a camera 23e for taking a digital image is disposed on a ceiling surface. An image over total circumference can be acquired by each of the cameras 23a, 23b, 23c and 23d. An image in upward direction can be acquired by the camera 23e. Images in all directions except downward direction can be acquired by the cameras 23*a*, 23*b*, 23*c* and 23*d*, and by the camera 23*e*. Further, by synthesizing images taken by the cameras 23*a*, 23*b*, 23*c* and 23*d* respectively, a panoramic image over total circumference can be prepared.

Inside the camera housing 22, an image data processing device 20 (see FIG. 2) is accommodated. Signals acquired by the cameras 23*a*, 23*b*, 23*c* and 23*d* and by the camera 23*e* are sent to the image data processing device 20 respectively. At the image data processing device 20, the data are compressed and are converted to images. The camera housing 22 is designed in watertight structure, designed in such manner that and the camera housing 22 can be installed on a ceiling of an automobile, for instance.

Figure 2:
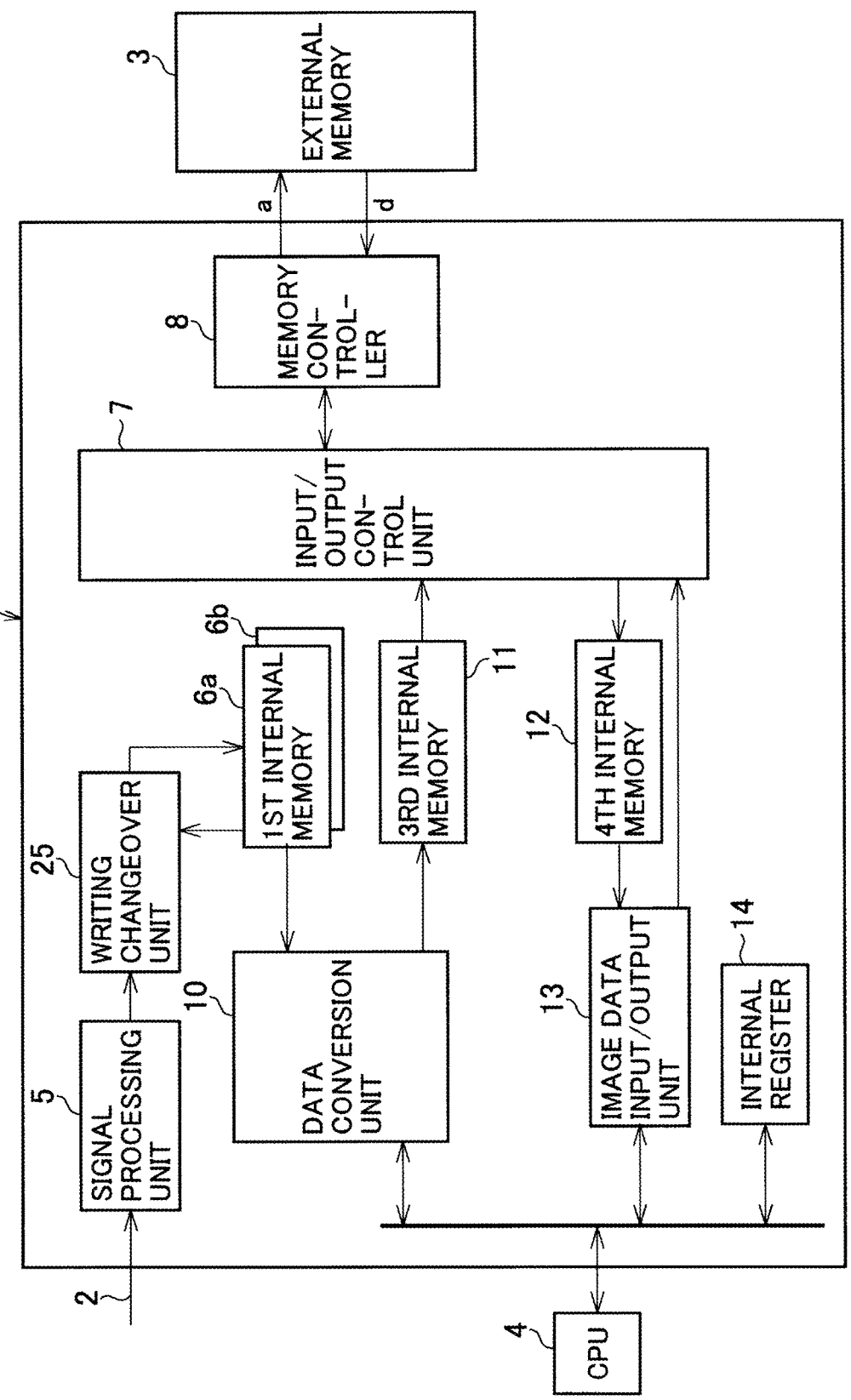
FIG. 2 is a schematical block diagram of an image data processing device to be used in the omnidirectional camera.
Figure 4:
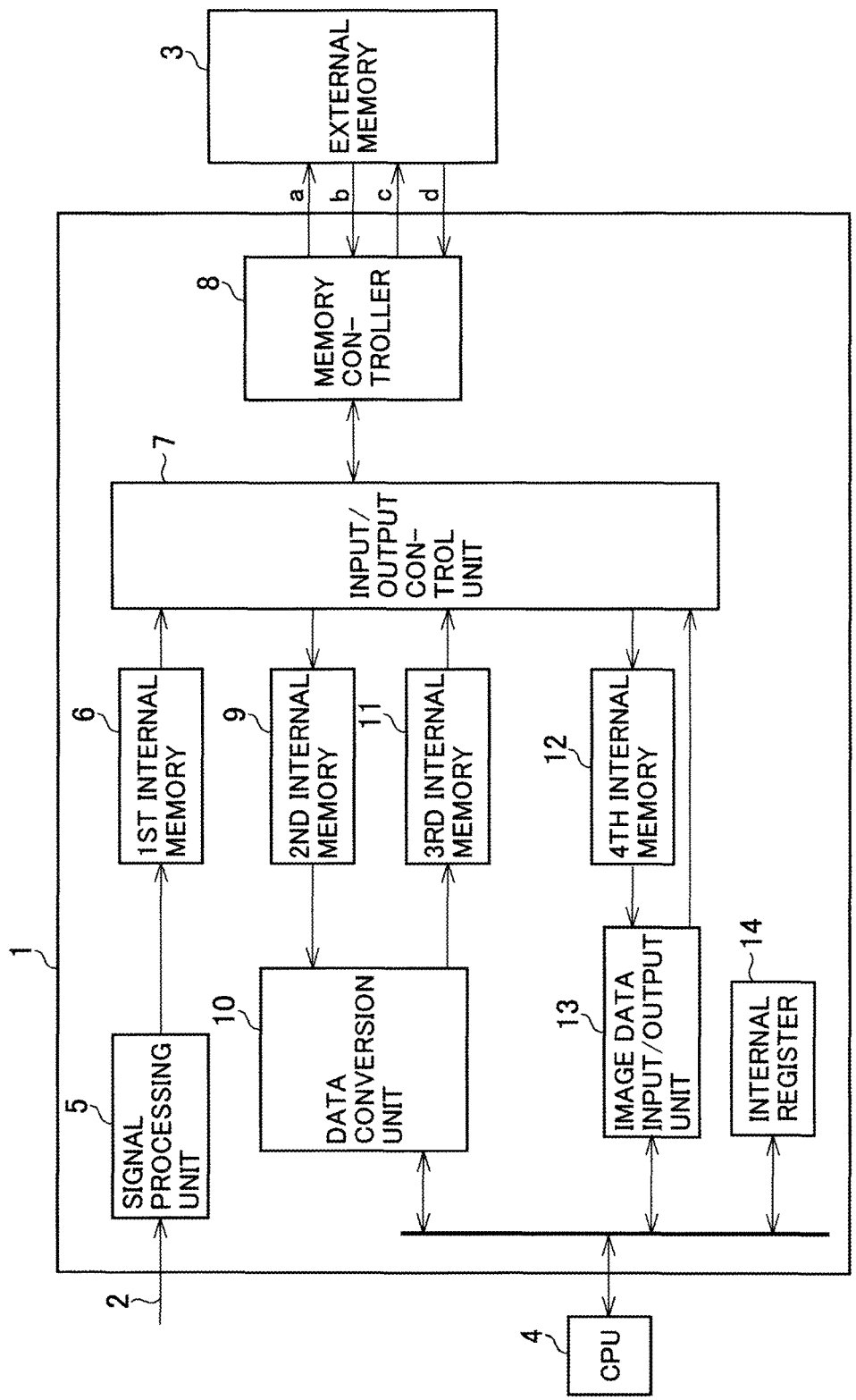
FIG. 4 is a schematical block diagram of a conventional image data processing device.

Next, by referring to FIG. 2, description will be given on the image data processing device 20 of the present embodiment. In FIG. 2, the same component as shown in FIG. 4 is referred by the same symbol, and detailed description will not be given here.

The image data processing device 20 primarily comprises a signal processing unit 5, a writing changeover unit 25, two first internal memories 6*a* and 6*b* installed on each of the cameras respectively, an input/output control unit 7, a memory controller 8, a third internal memory 11, a fourth internal memory 12, an image data input/output unit 13, and an internal register 14.

Because each processing of each individual signal as outputted from the cameras 23*a*, 23*b*, 23*c* and 23*d* and from the camera 23*e* is the same, description will be given on processing regarding a photodetection signal 2 inputted from the single camera 23*a*. The signals outputted from the cameras 23*a*, 23*b*, 23*c* and 23*d* and from the camera 23*e* are signals of image pickup elements.

The photodetection signal 2 from the camera 23*a* is inputted to the signal processing unit 5. The signal processing unit 5 takes in the photodetection signal 2 and converts the photodetection signal 2 thus taken in from a serial signal to a parallel signal, and converts the photodetection signal 2 to an 8-bit signal.

Signals from the signal processing unit 5 are by turns and alternatively inputted to either one of the first internal memories 6*a* or 6*b* via the writing changeover unit 25 in a predetermined amount and are accumulated in the first internal memories 6*a* and 6*b*. In this case, the predetermined amount of the data to be accumulated in each of the first internal memories 6*a* and 6*b* is extremely lower than capacities of the data for one frame of image or extremely lower than the capacities of the first internal memories 6*a* and 6*b*. The predetermined amount is preferably a data amount of minimal unit which the data conversion unit 10 can compress and convert to image data, e.g. it is a data amount of "8 pixels×8".

Each time a data amount as accumulated in the first internal memories 6*a* and 6*b* reaches a data amount "8 pixels×8", the data is outputted to the data conversion unit 10. Therefore, data of "8 pixels×8" are alternately inputted from the first internal memories 6*a* and 6*b* to the data conversion unit 10.

The writing changeover unit 25 controls accumulation and release of the data of the first internal memories 6*a* and 6*b*. For instance, in a case where the data are written in the first internal memory 6*a*, the data are outputted from the first internal memory 6*b* to the data conversion unit 10. When the data to be sent to the first internal memory 6*a* reaches the predetermined amount (8 pixels×8), the data are written in the first internal memory 6*b*, and the data accumulated in the first internal memory 6*a* are outputted to the data conversion unit 10.

The data conversion unit 10 converts and compresses the signals of "8 pixels×8" as inputted from one of the first internal memories 6. For instance, the data conversion unit 10 converts the data to image data of JPEG and outputs the data to the third internal memory 11. The third internal memory 11 temporarily stores the image data until an instruction to output the data is received from the input/output control unit 7.

In this case, data conversion by the data conversion unit 10 is in the minimal unit of image data conversion, and the data can be converted at high speed. Further, if it is so arranged that conversion speed (i.e. time period required for conversion) is set to a time period shorter than the time period, during which the data of the photodetection signal 2 is accumulated in one of the first internal memories 6*a* and 6*b*, there is no waiting time period for the output of the data from the first internal memories 6*a* and 6*b* to the data conversion unit 10, and taking-in of the data from the signal processing unit 5, conversion of the data to the image data and compression of the data are carried out at the same time in real time.

The input/output control unit 7 successively writes image data of the minimal unit, which are successively converted by the data conversion unit 10, to a predetermined region of the external memory 3 and at a predetermined address at a predetermined timing via the memory controller 8 (arrow mark "a" in FIG. 2). When the data to be written are accumulated to an amount for one frame, the memory controller 8 changes the region and the address where the data are to be written and controls so that the image data can be completed for each frame within the external memory 3.

In a case where measurement or other operations are to be carried out based on the image data, a data reading request is issued from the CPU 4. In response to the data reading request, each of the input/output control unit 7 and the memory controller 8 outputs the image data stored in the external memory 3 in a predetermined unit (arrow mark "d" in FIG. 2). The data amount in this case is in such an amount that the data can be stored in the fourth internal memory 12, e.g. "2048 pixels×16", etc. The image data thus read are outputted at a predetermined timing to the image data input/output unit 13.

As described above, according to the present embodiment, the data are alternately accumulated by setting two of the first internal memories 6*a* and 6*b* as one set, and data accumulated in one of the memories is converted while the other of the memories is accumulating the data. As a result, there is no need to accumulate the data for one frame in the external memory 3, and it is not necessary to perform the giving and the taking of the data between the external memory 3 and the image data processing device 20, which has been a bottleneck. Further, there is no need to have waiting time for data accumulation for one frame of data in the compression of the data and in the conversion processing to image data. As a result, the compression of the data and conversion of the image data can be carried out at extremely high speed.

In the above, description has been given on a case where one camera is used. In a case where there are two or more cameras, the signal processing unit 5, the first internal memories 6*a* and 6*b*, the data conversion unit 10, and the third internal memory 11 can be provided as many as the number of the cameras correspondingly to each camera.

Taking-in of the data and compression and conversion of the data can be carried out that way.

Figure 3:
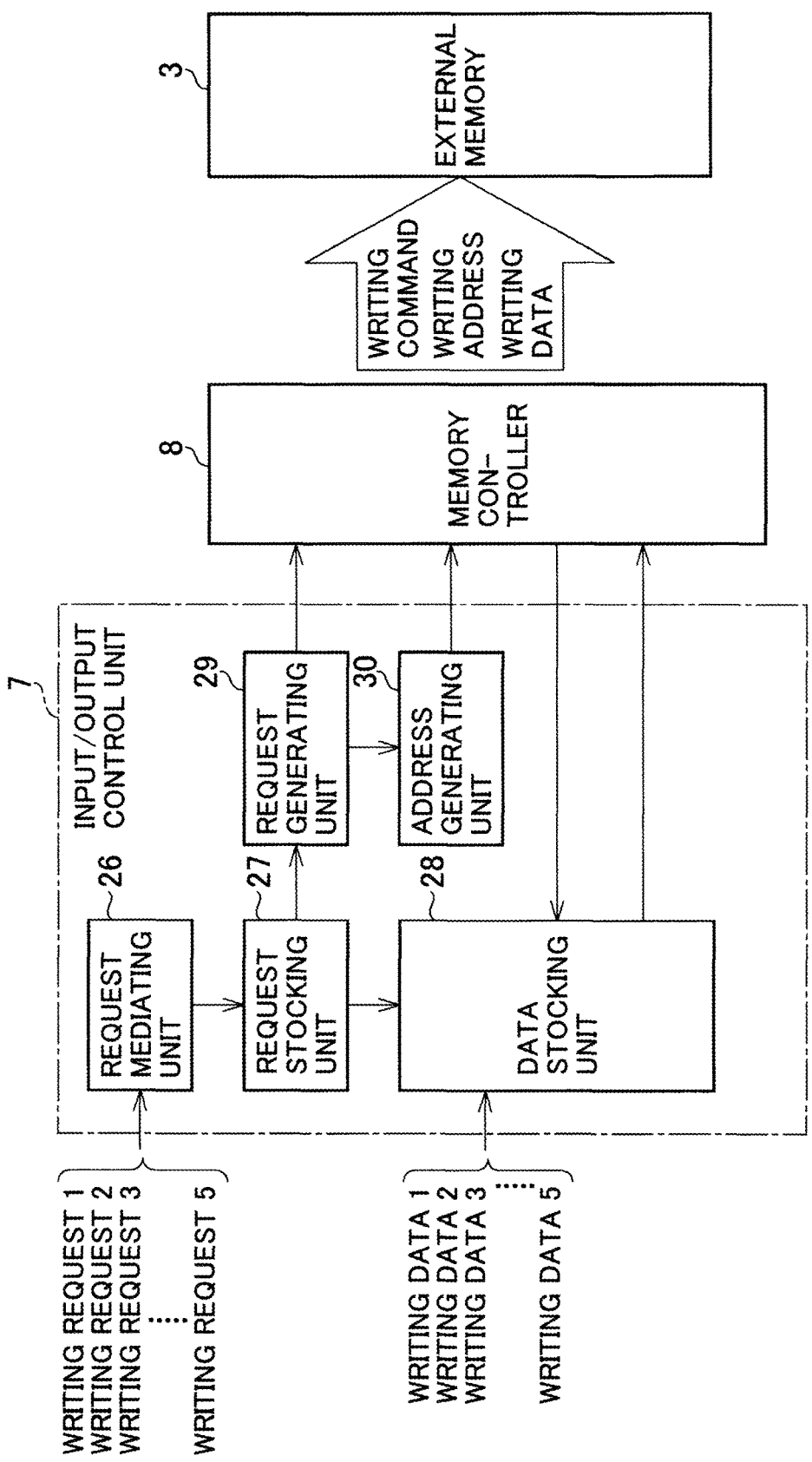
FIG. 3 is a block diagram of an input/output control unit of the image data processing device.

FIG. 3 shows a configuration of the input/output control unit 7 in a case where there are two or more cameras 23. In particular, a configuration of writing-in portion of the input/output control unit 7 is shown.

The input/output control unit controls the writing-in of the image data outputted from two or more third internal memories 11 to the external memory 3. The input/output control unit 7 comprises a request mediating unit 26, a request stocking unit 27, a data stocking unit 28, a request generating unit 29, and an address generating unit 30.

When the image data after compression and conversion are accumulated in the third memories 11, writing requests 1 to 5 are issued from each of the third internal memories 11 respectively, and the writing requests 1 to 5 are inputted to the request mediating unit 26. The request mediating unit 26 adds priority ranking to the writing requests 1 to 5 and stores the writing requests 1 to 5 in the request stocking unit 27. The priority ranking is sequentially determined from the one inputted earlier in terms of time so that there will be no waiting time or that the waiting time will be shortened.

From the third internal memory 11, the data corresponding to the writing requests 1 to 5 are outputted to the data stocking unit 28 and are temporarily stored in the data stocking unit 28.

The request generating unit 29 produces the writing request according to the priority ranking, for instance, the writing request 2 and the address generating unit 30 determines an address of the writing data 2 corresponding to the writing request 2 and inputs the address to the memory controller 8 together with the writing request 2. The memory controller 8 reads the writing data 2 (image data) corresponding to the writing request 2 based on the writing request 2 from the data stocking unit 28 and writes the writing data 2 on the address of the external memory 3.

Image data outputted from two or more third internal memories 11 are prepared as image data for each camera and for each frame within the external memories 3.

Even in a case where images are acquired by two or more cameras, compression and conversion of the data are carried out at the same time as the taking-in of the data, and only data converted to image data are sent to the external memories 3. Neither giving nor taking of the data before the conversion is performed between the image data processing device 20 and the external memory 3, and this makes it possible to speed up the conversion and the compression of the data.

In the above embodiment, an omnidirectional camera having 5 cameras is described, while the number of the cameras may be determined according to a field angle of the camera, and the number of the cameras is not limited to 5 cameras.

Also, the camera may not necessarily be a completed single unit, and may be image pickup element and optical system incorporated in a camera housing.

Further, the input/output control unit 7 may be integrated with the memory controller 8 as an input/output control unit, and the input/output control unit may control giving and taking of signals between the image data processing device 20 and the external memory 3, writing to the external memory 3 and data reading. Also, the third internal memory 11 may be used commonly as the data stocking unit 28.

The invention claimed is:

1. An omnidirectional camera, comprising a camera for acquiring a digital image, an image data processing device for compressing a signal outputted from said camera and for converting said signal to an image signal, and an external memory, wherein said image data processing device has a signal processing unit for taking in said signal, a writing changeover unit, two first internal memories in one set, a data converting unit, a third internal memory for temporarily storing the data after conversion outputted from said data converting unit, and an input/output control unit for controlling input and output of the data between said third internal memory and said external memory, and wherein said writing changeover unit accumulates signal outputted from said signal processing unit in one of said first internal memories until the data are accumulated to a predetermined amount, and when the data are accumulated to the predetermined amount, writing changeover unit changes destination of accumulation and repeatedly accumulates the data in the other of said first internal memories, and said signal is outputted to the data converting unit from said first internal memory where accumulation of said signal reaches the predetermined amount, and said data conversion unit compresses and converts an inputted signal to an image signal, and said image signal is successively inputted to said external memory by said input/output control unit, wherein the predetermined amount of the accumulated signal is only an amount of data of minimal unit to which the conversion unit can compress and convert the data.

2. An omnidirectional camera according to claim 1, comprising two or more said cameras, wherein said signal processing unit, said writing changeover unit, said two first internal memories in one set, said data conversion unit, and said third internal memory are provided as many as the number of said cameras correspondingly to each of said cameras respectively.

3. An omnidirectional camera according to claim 2, wherein said input/output control unit comprises a request mediating unit for giving priority ranking to each of two or more writing requests inputted from said third internal memory, and a data stocking unit for temporarily storing the data after conversion, which is outputted from the data conversion unit and corresponds to the writing request, and the data after conversion are written in said external memory according to said priority ranking as given.

4. An omnidirectional camera according to claim 1, wherein accumulation of data in one of the first internal memories, and compression and conversion of data in the other of the first internal memories is performed simultaneously in real time.

* * * * *

UNITED STATES PATENT AND TRADEMARK OFFICE
CERTIFICATE OF CORRECTION

PATENT NO. : 9,560,288 B2
APPLICATION NO. : 13/466604
DATED : January 31, 2017
INVENTOR(S) : Ishida et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 696 days.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*